United States Patent [19]

Ota et al.

[11] 4,257,033
[45] Mar. 17, 1981

[54] FAULT LOCATING SYSTEM IN OPTICAL FIBER TRANSMISSION SYSTEM

[75] Inventors: Chuichi Ota, Fuchu; Norio Seki; Haruo Sakaguchi, both of Tokyo, all of Japan

[73] Assignee: Kokusai Denshin Denwa Kabushiki Kaisha, Tokyo, Japan

[21] Appl. No.: 62,981

[22] Filed: Aug. 2, 1979

[30] Foreign Application Priority Data

Aug. 7, 1978 [JP] Japan ................................. 53-95411

[51] Int. Cl.³ ..................... H04B 9/00; G08C 25/00; G08C 19/36
[52] U.S. Cl. ........................... 340/870.16; 179/170 F; 179/175.31 R; 340/870.29; 375/4; 455/601
[58] Field of Search ............... 340/201 R, 201 P, 190, 340/189 R, 177 R; 325/2; 179/175.3 F, 175.3 A, 175.31 R, 170 F, 170 R; 250/199; 455/601, 608, 612, 618, 8, 9; 361/107, 173–175; 375/4

[56] References Cited

U.S. PATENT DOCUMENTS

| | | | |
|---|---|---|---|
| 3,705,307 | 12/1972 | Reeves et al. | 250/199 |
| 3,731,203 | 5/1973 | Lieberman | 179/170 F |
| 3,917,916 | 11/1975 | Ghosh | 179/175.31 R |
| 4,047,127 | 2/1978 | Mochida et al. | 250/199 |

FOREIGN PATENT DOCUMENTS

2012949  8/1979  United Kingdom .................... 455/601

*Primary Examiner*—James J. Groody
*Attorney, Agent, or Firm*—Robert E. Burns; Emmanuel J. Lobato; Bruce L. Adams

[57] ABSTRACT

A fault location system in an optical fiber transmission system, in which a plurality of optical signal regenerative repeaters are sequentially connected in cascade in an optical fiber transmission cable at predetermined intervals to transmit digital information in the form of optical signals. Each of the plurality of optical signal regenerative repeaters sends out a fault location information signal composed of an inherent pattern and a fixed pattern when a fault occurs in the corresponding repeater. The inherent pattern is uniquely assigned to the optical signal regenerative repeater from a plurality of individually distinguishable inherent patterns obtained by establishing the start bits of a pseudo-noise sequence at time positions successively delayed from one after another. The fixed pattern is necessary for indicating the time positions of the start bits. A malfunction position in the optical fiber transmission system can be detected by detecting the fault location information signal at a monitor station in the optical fiber transmission system.

3 Claims, 7 Drawing Figures

FAULT LOCATING SYSTEM IN OPTICAL FIBER TRANSMISSION SYSTEM

BACKGROUND OF THE INVENTION

1. Field of the Invention

This invention relates to a system for locating a fault, such as malfunction of a repeater or the like, in an optical fiber transmission system in which optical fibers are used as a transmission line and a plurality of optical signal regenerative repeaters are sequentially connected in cascade at predetermined intervals for digital signal transmission.

2. Prior Art

Heretofore, there has been proposed a fault location system providing with a fault monitoring intervence core in a land optical fiber transmission system. In a submarine cable employing optical fibers, however, the use of such an intervence core involves an amplifier for the exclusive use of a monitoring signal, resulting in the defects of enlarged circuit scale of the repeater, increased power dissipation and markedly raised transmission cost.

SUMMARY OF THE INVENTION

An object of this invention is to provide an economical and highly reliable fault locating system for an optical fiber regenerative repeatered cable system in which in order to avoid the abovesaid defects resulting from the use of the fault monitoring intervence core, a fault location information signal inherent to each repeater is generated in the repeater and transmitted via a main signal conductor to thereby locate a fault.

In accordance with this invention, there is proposed a fault location system in an optical fiber transmission system, in which a plurality of optical signal regenerative repeaters are sequentially connected in cascade in an optical fiber transmission cable at predetermined intervals to transmit digital information in the form of optical signals. Each of the plurality of optical signal regenerative repeaters sends out a fault location information signal composed of an inherent pattern and a fixed pattern when a fault occurs in the corresponding repeater. The inherent pattern is uniquely assigned to the optical signal regenerative repeater from a plurality of individually distinguishable inherent patterns obtained by establishing the start bits of a pseudo-noise sequence at successively different times from one another. The fixed pattern is necessary for indicating the time positions of the start bits. A malfunction position in the optical fiber transmission system can be detected by detecting the fault location information signal at a monitor station in the optical fiber transmission system.

BRIEF DESCRIPTION OF THE ACCOMPANYING DRAWING

The present invention will be clearly understood from the following detailed description taken in conjunction with the accompanying drawings, in which.

DETAILED DESCRIPTION

Figure 1:
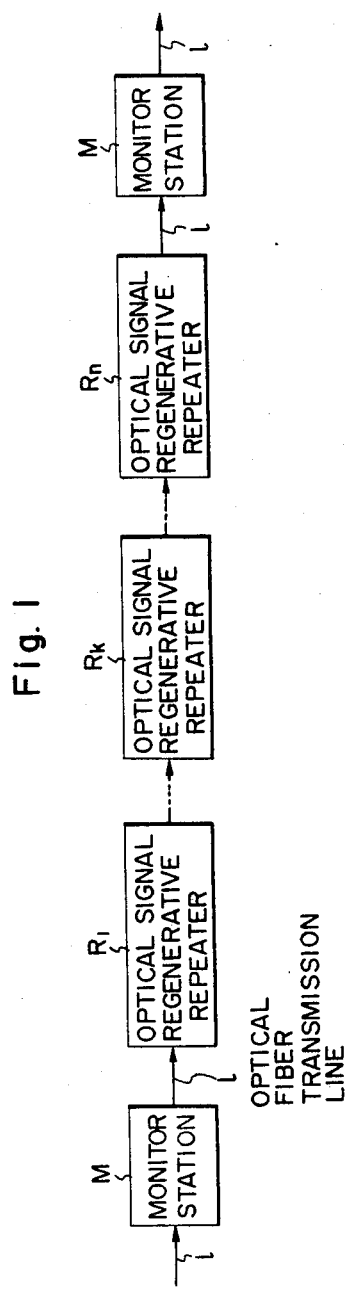
FIG. 1 is a block diagram explanatory of the overall structure of an optical fiber transmission system to which this invention is applied.

With reference to FIG. 1 showing an optical fiber regenerative repeatered cable system, to which this invention is applied, reference character M indicates a monitor station; $R_1, \ldots R_k, \ldots R_n$ designate optical signal regenerative repeaters to be monitored; and 1 identifies optical fiber transmission lines.

Figure 2:
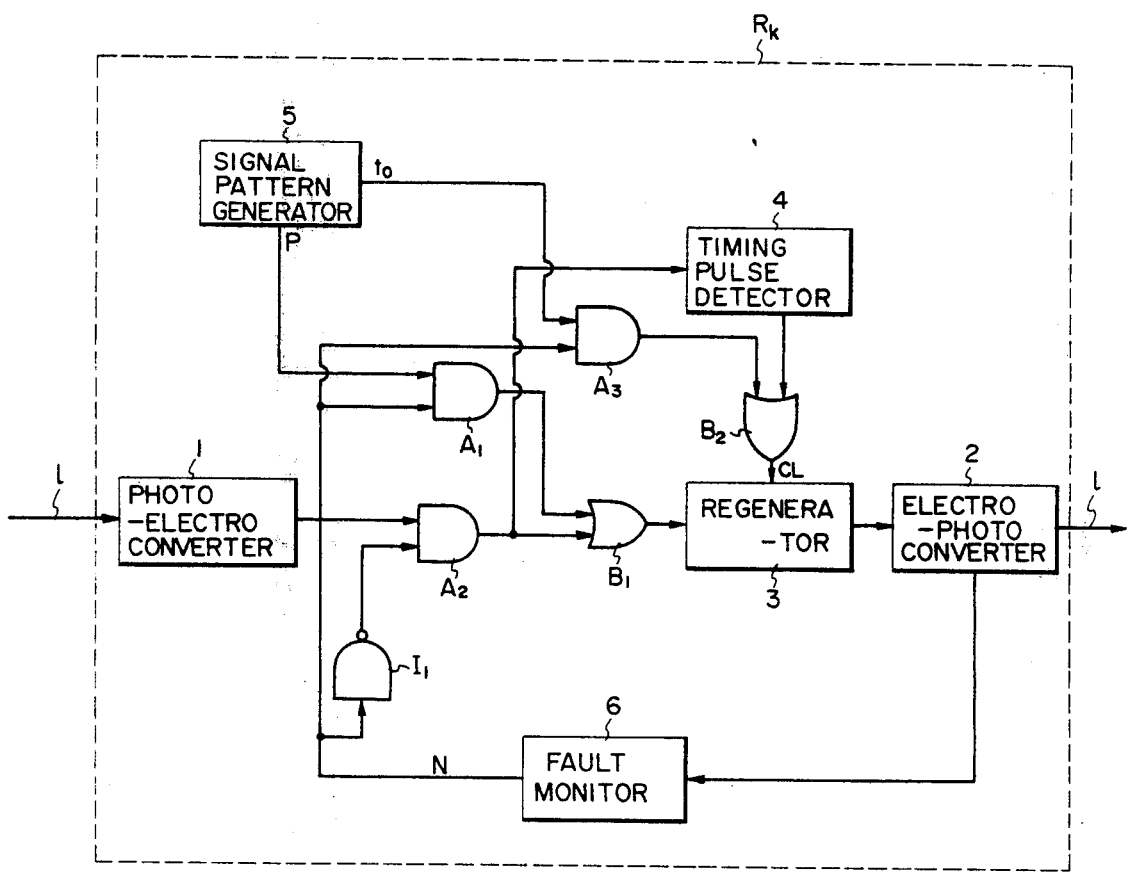
FIGS. 2, 3 and 4 are block diagrams respectively illustrating the structure of examples of an optical signal regenerative repeater, a electro-photo converter and fault monitor and a signal pattern generator for use in the system of this invention.

FIG. 2 shows the construction of the optical signal regenerative repeater $R_k$ utilized in FIG. 1. Reference numeral 1 indicates a photoelectro converter including a photo detector and an amplifier or equalizer; 2 designates an electro-photo converter including an optical source and an optical source driver; 3 identifies a regenerator; 4 denotes a timing pulse detector; 5 represents a signal pattern generator for generating a fault location information signal including clock pulses and a signal pattern inherent to the repeater; 6 shows a fault monitor; $A_1$, $A_2$ and $A_3$ refer to AND gates; $B_1$ indicates an OR gate; and $I_1$ designates a NOT circuit. The signal pattern generator 5 generates, as the aforesaid inherent signal pattern, a particular pattern assigned to the optical signal regenerative repeater from a plurality of individually distinguishable signal patterns which are obtained by establishing the start bits of a PN sequence (a pseudo-noise sequence) at time positions successively delay from one after another. The clock pulses are inserted for identification of each particular pattern and the abovesaid time positions of the start bits.

When a fault occurs, the fault monitor 6 of the regenerative repeater provides a signal N ("1" in a case of a fault occurring) to the gate circuitry associated with the signal pattern generator 5, while the signal pattern generator 5 applies an inherent pattern signal P via the gates $A_1$ and $B_1$ to the regenerator 3 and clock pulses $t_0$ via the gates $A_3$ and $B_2$ to the clock input CL of the identify regenerative circuit 3. The inherent pattern signal P thus regenerated is subjected to electro-photo conversion by the electro-photo converter 2, thereafter being provided on the transmission line 1. The inherent pattern signal P thus sent out is one of the aforementioned plurality of individually distinguishable patterns obtained by establishing the time of the respective start bit of each PN sequence (pseudo-noise sequence) successively different from one another in each signal pattern generator 5; therefore, the inherent pattern signal P reaches the monitor station M passing through the repeaters of the succeeding stages. Since the inherent pattern signal P received by the monitor station M is inherent to one of the repeaters, the malfunctioning repeater can be detected by decoding the received pattern signal.

Figure 3:
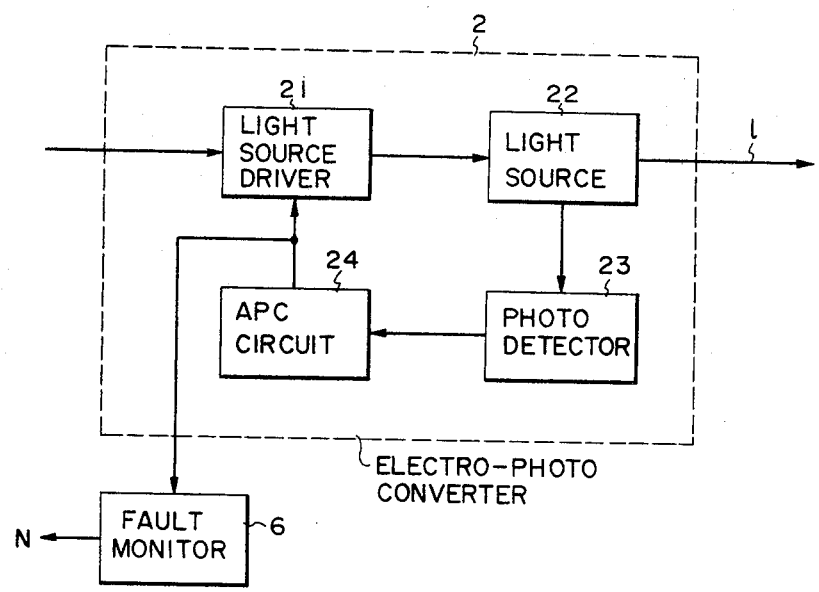

FIG. 3 illustrates, by way of example, the electro-photo converter 2 and the fault monitor 6 used in FIG. 2. In FIG. 3, reference numeral 21 in the electro-photo converter 2 indicates a light source driver; 22 refers a light source; 23 identifies a photo detector; and 24 denotes an APC (Automatic Power Control) circuit. During a normal operation, the output from the light source 22 is monitored by the photo detector 23 and the light source driver 21 is controlled by the APC circuit 24 to control a bias current of the light source 22, by which an optical source output of a constant level can be obtained at all times. However, as the light source 22 becomes degraded, the bias current of the light source 22 increases to reach a certain critical value. Then, the output from the APC circuit 24 corresponding to the critical value of the bias current is applied to the fault monitor 6 (which is constructed with a threshold circuit in this case) to derive therefrom a signal N when the bias current exceeds the critical value.

In this instance, a fault is monitored at the light source. The reason is that the reliability of the light source now available is lower than that of electrical circuit elements by more than three digits and faults occur most frequently in the light source.

Figure 4:
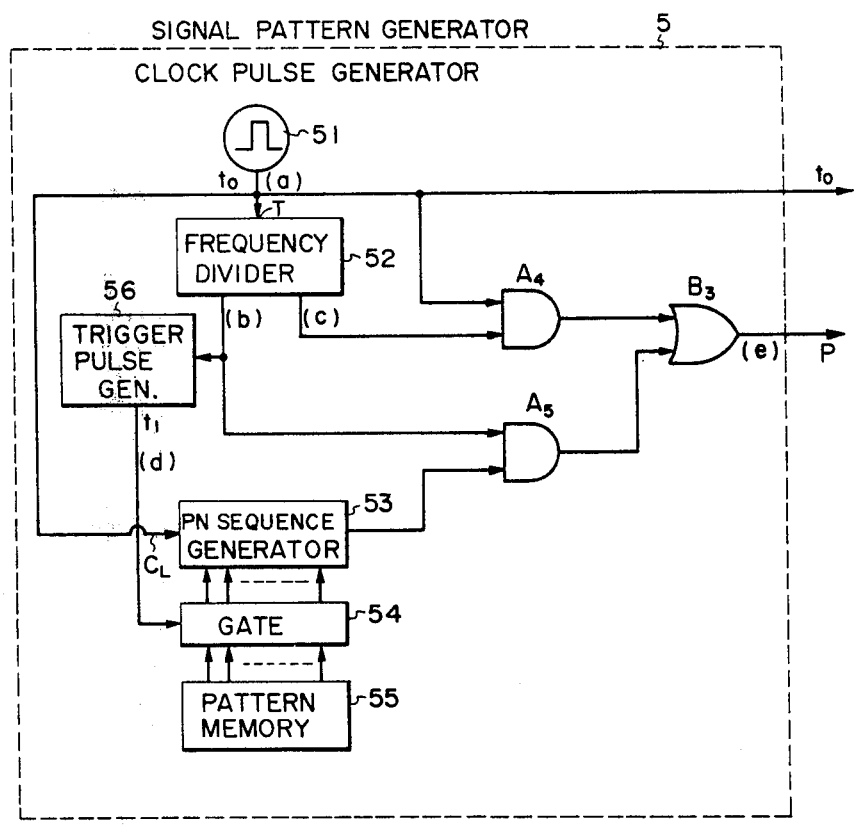

FIG. 4 illustrates an example of the signal pattern generator 5 for use in the present invention. In FIG. 4, reference numeral 51 indicates a clock pulse generator; 52 designates a frequency divider; 53 identifies a PN sequence generator; 54 denotes a gate; 55 represents an initial value pattern memory for determining the time positions of the start bits of the PN sequence; and 56 shows a trigger pulse generator.

Figure 5:
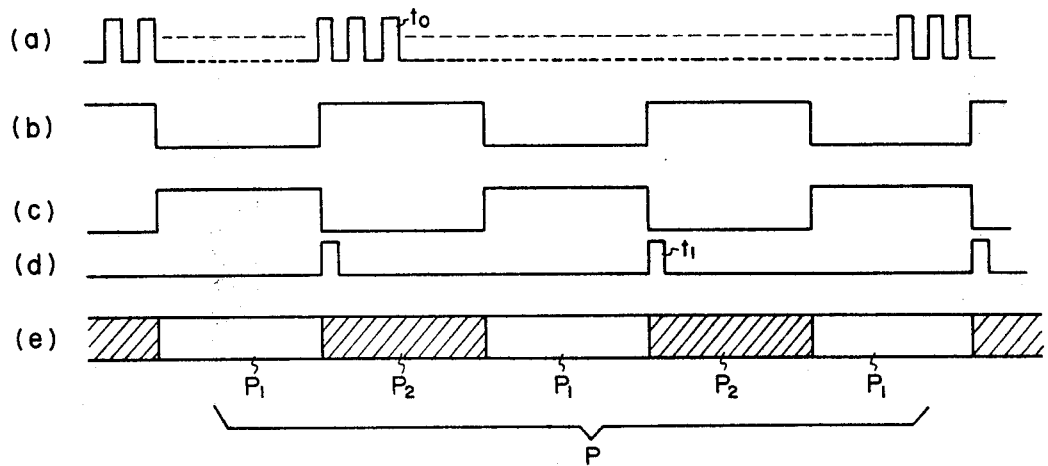
FIG. 5 shows signal waveforms explanatory of the operation of this invention system.

FIG. 5 is a diagram showing signal trains necessary for explaining the operation of the inherent pattern generator 5 utilized in FIG. 4. A train (a) shows the output pulses $t_0$ from the clock pulse generator 51; trains (b) and (c) output signals from the frequency divider 52; a train (d) output pulses $t_1$ from the trigger pulse generator 56; and a train (e) the output signal P from the signal pattern generator 5, which is composed of pattern $P_1$ and $P_2$. When the state of the pulse train (c) is ON, the state of the pulse train (b) is OFF, so that a gate $A_4$ is opened and the output pulses (a) from the clock pulse generator 51 are sent out as the output pulses from the signal pattern generator 5 to provide the fixed pattern $P_1$ of the train (e). When the state of the train (b) is ON, the state of the train (c) is OFF, so that a gate $A_5$ is opened and the gate 54 is opened by the signal $t_1$; thus, an initial value pattern is applied from the initial value pattern memory 55 to the PN sequence generator 53 so that a PN sequence driven by the clock pulses $t_0$ is sent out of the PN signal sequence generator 53 via the gates $A_5$ and $B_3$, providing the inherent pattern $P_2$ of the train (e). The patterns $P_1$ and $P_2$ form a fault location information signal P.

Figure 6:
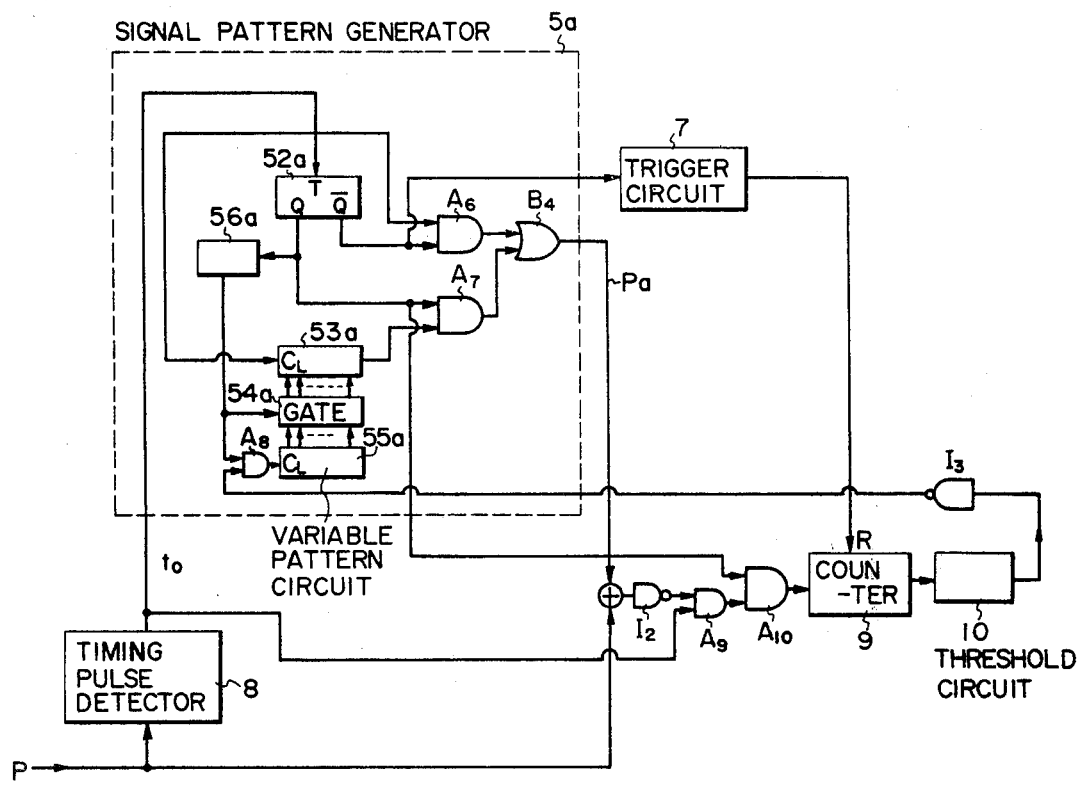
FIG. 6 illustrates an example of the construction of a fault location information receiver for use in this invention system.

FIG. 6 illustrates the construction of a circuit for receiving and decoding the fault location information signal P in the monitor station M used in FIG. 1. In FIG. 6, reference numeral 5a, indicates a signal pattern generator which is exactly identical in construction with the signal pattern generator 5 in FIG. 4 except for a variable pattern circuit 55a; 7 designates a trigger circuit; 8 identifies a timing pulse detector; 9 denotes a counter (R being a reset input); and 10 represents a threshold circuit. In FIG. 6, the timing pulse detector 8 extracts clock pulses $t_0$ from the fixed pattern $P_1$ of the fault location information signal P and, by the clock pulses $t_0$, the circuit 5a is driven to actuate the PN sequence generator 53a, providing an inherent pattern P'. The pattern P' and the inherent pattern P from a malfunctioning repeater are compared with each other to detect the coincidence therebetween. It is decided by the counter 9 and the threshold circuit 10 whether or not the patterns P and P' are coincident with each other, and in the case of non-coincidence, the set value of the variable pattern circuit 55a, is shifted by one. Thus, the set value of the variable pattern circuit 55a is sequentially changed to alter the initial phase of the PN sequence generator 55a. In a case of coincidence, it indicates that the fault location information signal P has been sent from the repeater corresponding to the content of the variable pattern circuit 55a; consequently, the malfunctioning repeater can be detected.

In FIG. 5, the clock pulses $t_0$ are used as the fixed pattern $P_1$, but another code pattern can be used. Further, in FIG. 5, the fixed pattern $P_1$ and the inherent pattern $P_2$ are of the same length, but the length of the fixed pattern $P_1$ can be changed independently of the length of the inherent pattern $P_2$.

Figure 7:
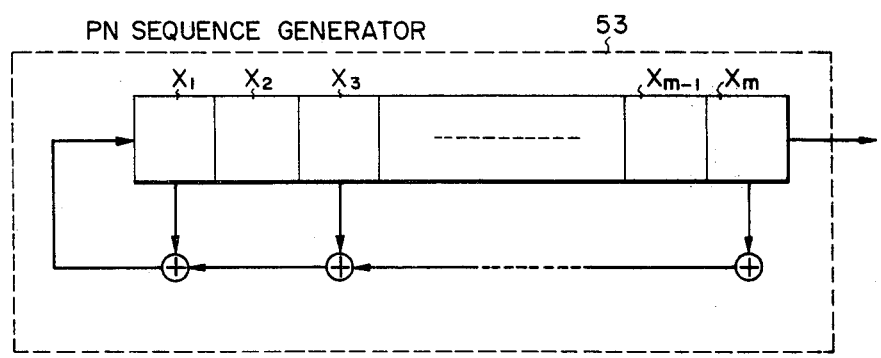
FIG. 7 shows the arrangement of a PN sequence generator.

FIG. 7 shows the construction of the PN sequence generator 53 heretofore employed. Reference characters $x_1, x_2, \ldots x_m$ indicate an m-bit shift register, and the PN sequence (pseudo-noise sequence) derived therefrom has $(2^m - 1)$ bit period, and the number of initial value patterns $x_{10}, x_{20}, \ldots x_{m0}$ of the shift register is also $2^m - 1$. Accordingly, for example, if initial value patterns are set so as to be shifted by one bit for respective repeaters, inherent patterns can be set for $(2^m - 1)$ repeaters. Considering an optical submarine cable 8000 km distance across the Pacific Ocean between Japan and the United States, about 250 repeaters are required; but, if use is made of a PN sequence generator formed with a shift register in which $m = 8$, inherent patterns obtainable are $2^m - 1 = 255$, so that the PN sequence generator can be constructed with $m = 8$ bits at least.

In accordance with the system of this invention, when the light source is gradually degraded, the repeater having incorporated therein the light source applies a fault location information signal to the monitor station; but in a case where the light source is degraded instantaneously and no light output is derived therefrom, no fault location information signal is transmitted from the malfunctioning repeater, but by monitoring the bias current of the photo detector of an AGC (Automatic Gain Control) circuit of the immediately succeeding repeater by the fault monitor 6 and by providing the signal N when the bias current exceeds a certain value, a fault location information signal is transmitted from this repeater.

As has been described above, this invention provides an economical and highly reliable malfunctioning repeater detecting system in an optical fiber transmission system and greatly contributes to the development of an optical communication system.

What we claim is:

1. In a fault location system in an optical fiber transmission system, in which a plurality of optical signal regenerative repeaters are sequentially connected in cascade in an optical fiber transmission cable at predetermined intervals to transmit digital information in the form of optical signals, the improvement comprising:

monitor means provided in each of a plurality of said optical signal regenerative repeaters for monitoring the output level of the optical signal regenerative repeater;

fault location information signal sending-out means provided in each of a plurality of said optical signal regenerative repeaters and connected to said monitor means for sending out to the output of the optical signal regenerative repeater, instead of said digital information, a fault location information signal composed of an inherent pattern and a fixed pattern when said monitor means detects that the output level of the optical signal regenerative repeater has lowered below a predetermined level, said inherent pattern being uniquely assigned to the optical signal regenerative repeater from a plurality of individually distinguishable inherent patterns obtained by establishing the start bits of a pseudo-noise sequence at time positions successively delayed one after another, the fixed pattern being necessary for indicating the time positions of the start bits; and detection means provided in a monitor station of the optical fiber transmission system for detecting said fault location information signal from the fixed pattern and a corresponding one of said optical signal regenerative repeaters, which sends out the inherent pattern, from the time position of the start bit, thereby to detect a malfunction position in the optical fiber transmission system.

2. In an optical digital signal regenerative repeater, a fault warning system comprising:

monitor means for monitoring a signal indicative of the condition of the optical digital signal regenerative repeater; and fault warning means for transmitting a fault warning signal from the optical digital signal regenerative repeater, said fault warning means cooperating with said monitor means for transmitting the fault warning signal when the signal monitored by said monitor means indicates malfunctioning of the optical digital signal regenerative repeater, and said fault warning means transmitting a fault warning signal comprised of a unique digital optical pulse pattern selected from a plurality of individually distinguishable unique patterns obtained by establishing the start bits of a pseudo-noise sequence at time positions successively delayed with respect to each other and a fixed digital optical pulse pattern for indicating the time positions of the start bits of the unique pulse pattern, whereby identification of the unique digital optical pulse pattern of the fault warning signal enables identification of the optical repeater which transmitted the fault warning signal.

3. In an optical digital signal regenerative repeater according to claim 2, said monitor means being effective for monitoring the output level of the optical digital signal regenerative repeater, and said fault warning means responds to said monitor means and transmits a fault warning signal when the output level of the optical digital signal regenerative repeater is less than a predetermined value.

* * * * *